No. 727,460. PATENTED MAY 5, 1903.
M. O. SCHREIBER.
AGRICULTURAL IMPLEMENT.
APPLICATION FILED NOV. 22, 1902.
NO MODEL.
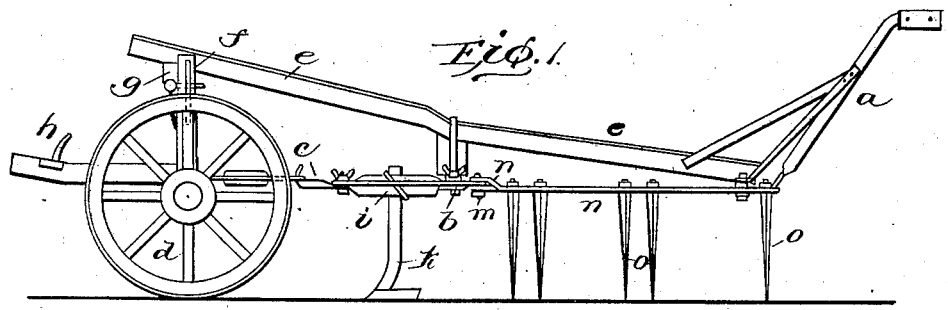
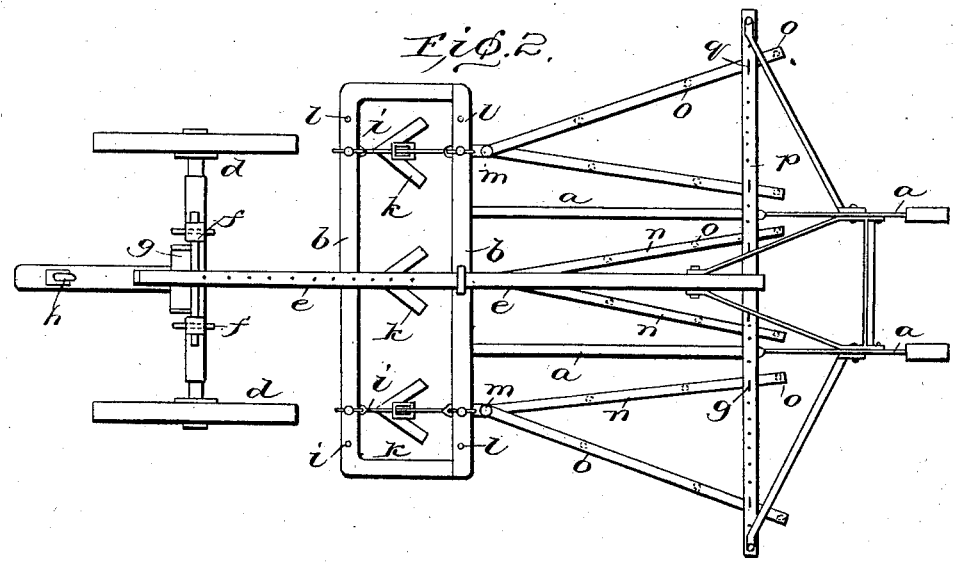

No. 727,460. Patented May 5, 1903.

UNITED STATES PATENT OFFICE.

MORITZ OSWIN SCHREIBER, OF NIEDERGOSELN, NEAR MÜGELN, GERMANY.

AGRICULTURAL IMPLEMENT.

SPECIFICATION forming part of Letters Patent No. 727,460, dated May 5, 1903.

Application filed November 22, 1902. Serial No. 132,444. (No model.)

*To all whom it may concern:*

Be it known that I, MORITZ OSWIN SCHREIBER, a subject of the King of Prussia, Emperor of Germany, residing at Niedergoseln, near Mügeln, (Leipzig,) in the Empire of Germany, have invented certain new and useful Improvements in or Relating to Agricultural Implements, of which the following is a specification..

The present invention relates to that class of instruments which is employed for raising beets, turnips, and other root crops and for drill-harrowing the ground at the same time.

The apparatus comprises a front-wheel support, to which the horse or other draft-animal is harnessed, said support being preferably mounted on two wheels and having connected or linked to it a frame carrying the root-raising blades, while to the frame is attached a second frame carrying depending drills or rods, to the rear of which frame is attached any suitable handle or guiding device. Over the above parts is a longitudinal beam connecting them all together and resting at its forward end upon a vertically-adjustable support on the wheeled support.

In the accompanying drawings, Figure 1 shows the apparatus in side elevation, while Fig. 2 is a plan.

The frame $b$, controlled by the handle-bars $a$, is flexibly connected by a chain or link $c$ to the wheeled support $d$ and is supported in a manner known in agricultural machines by means of a beam $e$ upon the wheeled support in an adjustable manner, thereby controlling the depth of insertion of the blades and simplifying the steering. The wheeled frame carries for this purpose upright supporting-brackets $f$, with a cross-bar $g$ connecting the brackets, the bar $g$ being adjustable in vertical direction, while upon it the beam $e$ is movable in longitudinal direction. The traces for the animals are fixed at $h$.

Across the frame $b$ are arranged in this instance three cross-bars $i$, upon which are mounted the root-lifters $k$ in any suitable manner and which are adjustable in vertical direction. Both the outer cross-bars can also be displaced laterally toward the center bar.

In the position shown in Fig. 2 the apparatus is adjusted for turnips or sugar-beets. When, however, the cross-bars $i$ are secured in the more remote outer openings $l$, this adjustment corresponds to the largest spacing for beet-roots. Instead of arranging double-sided lifters $k$ single and one-edged lifters can of course be used.

To the rear of the frame $b$ are flexibly connected a series of bars $n$ in pairs hinged together at the forward parts. These bars are provided with depending spikes $o$ and at the open ends are laterally adjustable upon a cross-bar $p$, provided with suitable perforations or means of connection for this purpose. The usual pegs or securing-bolts $q$, preferably of U shape, can be used for securing the bars. On moving the bars $i$ outwardly the same action is also communicated to the outer joints $m$ of the connecting-bars $n$.

I claim—

1. An agricultural implement comprising a front wheeled support a frame movably connected thereto, adjustable blades depending from said frame, an adjustable second frame flexibly connected to the latter, depending rods mounted thereon, a handle connected to the rear part of said adjustable frame, and a beam above and connected to the said three parts and means for vertically adjusting the forward end of said beam, substantially as described.

2. An agricultural implement comprising a front wheeled support vertical brackets thereon a frame flexibly connected to said wheeled support vertically and horizontally adjustable blades depending from said frame a series of bars connected in pairs to said frame at their forward ends a series of rods depending from said bars a handled cross-bar and means for securing the rear ends of said rods to the cross-bar in adjusted positions and a longitudinal bar connected to the cross-bar and the frame and resting upon an adjustable cross-bar carried by the bracket on the wheeled support, substantially as described.

3. An agricultural implement comprising a front wheeled support a longitudinal beam a vertically-adjustable bearing on said wheeled support for the forward end of said beam a blade-carrying frame and a drill-carrying frame flexible connections between the two frames and the blade-carrying frame and the wheeled support and connections between the two frames and the longitudinal beam.

In testimony whereof I have signed my name to this specification in the presence of two subscribing witnesses.

MORITZ OSWIN SCHREIBER.

Witnesses:
CARL GREIERT,
OTTO WOGL.